United States Patent
Gong et al.

(10) Patent No.: US 8,583,120 B2
(45) Date of Patent: Nov. 12, 2013

(54) METHOD FOR RADIO ACCESS TECHNOLOGY CHANGE

(75) Inventors: Win-Chyi Gong, Taoyuan County (TW);
Hsing-Yu Lung, Taoyuan County (TW);
Chien-Jen Huang, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 0 days.

(21) Appl. No.: 13/360,812

(22) Filed: Jan. 30, 2012

(65) Prior Publication Data

US 2013/0053036 A1 Feb. 28, 2013

Related U.S. Application Data

(60) Provisional application No. 61/529,254, filed on Aug. 31, 2011.

(51) Int. Cl.
*H04W 36/00* (2009.01)

(52) U.S. Cl.
USPC ............ 455/436; 455/435.1; 455/435.2; 455/435.3

(58) Field of Classification Search
USPC ............ 370/331; 455/434, 435.1–435.3, 436
See application file for complete search history.

(56) References Cited

U.S. PATENT DOCUMENTS

| | | | |
|---|---|---|---|
| 2007/0275717 A1 | 11/2007 | Edge | |
| 2011/0059739 A1* | 3/2011 | Huang | 455/435.1 |
| 2011/0182240 A1* | 7/2011 | Kanauchi et al. | 370/328 |
| 2011/0207453 A1* | 8/2011 | Hsu et al. | 455/424 |

FOREIGN PATENT DOCUMENTS

| | | |
|---|---|---|
| EP | 2117274 A1 | 11/2009 |
| EP | 2249607 A1 | 11/2010 |
| WO | 2011096870 A1 | 8/2011 |

OTHER PUBLICATIONS

European patent application No. 12000847.9, European Search Report mailing date:Apr. 11, 2012.
3GPP TS 25.304 V10.0.0 (Mar. 2011) 3rd Generation Partnership Project; Technical Specification Group Radio Access Network; User Equipment (UE) procedures in idle mode and procedures for cell reselection in connected mode (Release 10).
3GPP TS 25.331 V10.3.1 (Apr. 2011) 3rd Generation Partnership Project; Technical Specification Group Radio Access Network; Radio Resource Control (RRC); Protocol specification (Release 10).

* cited by examiner

*Primary Examiner* — Wesley Kim
*Assistant Examiner* — Dinh P Nguyen
(74) *Attorney, Agent, or Firm* — Winston Hsu; Scott Margo

(57) ABSTRACT

A method for radio access technology, hereafter called RAT, change for a mobile device is disclosed. The method comprises whenever camping on a RAT, collecting cell information for at least one cell, falling back to a first RAT, and performing an offline procedure for moving to the camped RAT from the first RAT according to the collected cell information.

6 Claims, 5 Drawing Sheets

| Cell DB index | System | PLMN | System Priority | DL Frequency Channel | Cell ID |
|---|---|---|---|---|---|
| 0 | LTE | 310 410 | 1 | 5730 | 33 |
| 1 | LTE | 310 410 | 1 | 5730 | 23 |
| 2 | UMTS | 310 410 | 2 | 10769 | 10 |
| 3 | UMTS | 310 410 | 2 | 10776 | 5 |
| 4 | GSM | 310 410 | 3 | 400 | 1 |

FIG. 4

METHOD FOR RADIO ACCESS TECHNOLOGY CHANGE

CROSS REFERENCE TO RELATED APPLICATIONS

This application claims the benefit of U.S. Provisional Application No. 61/529,254, filed on Aug. 31, 2011 and entitled "Offline Procedure for High Priority System Change", the contents of which are incorporated herein in their entirety.

BACKGROUND OF THE INVENTION

1. Field of the Invention

The application relates to a method utilized in a wireless communication system, and more particularly, to a method for radio access technology change in a wireless communication system.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

Moreover, inter-radio access technology (inter-RAT) mobility involves transfer of a connection or mobility between a UE and a network from one RAT (e.g. the LTE system) to another RAT, such as Global System for Mobile communications (GSM)/Global Packet Radio Service (GPRS), Universal Mobile Telecommunications System (UMTS), or Code Division Multiple Access (CDMA) system. However, the applicant notices that a UE may encounter problems associated to the inter-RAT procedure as below based on a direct image on a basis of the prior art LTE system.

A UE performs the inter-RAT procedure to move to a RAT due to handover, cell redirection, or cell reselection. After that, if the UE needs to move to a previously camped RAT, the UE executes PLMN search, cell redirection or cell reselection. In the case of PLMN search, the UE has to stop all of the on-going procedures, re-searches for a PLMN, and then searches for a cell of the PLMN. However, with such manner, the UE may not be able to move to the camped RAT, or takes a lot of time to move to the camped RAT. In the case of cell reselection or cell redirection, a network (e.g. a cell, NB or eNB) of the RAT has to provide the UE of cell information or redirection information associated to the camped RAT. Thus, the UE can perform measurement according to the cell information, and thereby reselects a cell of the camped RAT if the measured cell fulfills a criterion in cell reselection, or can be directed to the camped RAT. However, these methods require signaling between the UE and the network, which increases signaling number. In addition, the network may require to be upgraded to provide abovementioned cell information/redirection information, which increases the cost to the network operator.

For example, a UE in the LTE system may fallback to legacy system, such as UMTS and GSM, due to out of service, cell reselection, handover, circuit-switched fallback (CS fallback) and Internet Protocol Multimedia Subsystem (IMS) Single Radio Voice Call Continuity (SRVCC). Once the UE fallbacks to the legacy system, it is difficult to return to LTE due to lack of LTE cell information provided by the legacy system. Note that, the legacy systems generally lack of LTE cell information due to network planning. More specifically, in order to return to the LTE system, the UE may perform PLMN search/cell reselection/cell redirection. In the case of PLMN search, the UE has to stop all of the on-going procedures, re-searches for a PLMN, and then searches for a cell of the PLMN. With such manner the UE may not be able to return to the LTE system and may take a lot of time to return to the LTE system. In the case of cell reselection, the cell of the legacy system has to provide LTE cell information to the UE (i.e. by system information broadcasting), and thereby the UE performs measurement based on the LTE cell information. If signal strength or signal quality of a measured LTE cell reaches the criterion in the cell reselection, the UE selects the LTE cell so as to return to the LTE system. However, due to the network planning, the cell of the legacy system carries no LTE cell information. Thus, in order to provide LTE cell information, cells of the legacy system have to be upgraded, which increases the cost to the network operator. In the case of the cell redirection, the network (i.e. NB) of the legacy system has to provide redirection information to indicate the UE to return to the LTE system (i.e. by a RRC connection release message), and thereby the UE returns to the LTE system. However, in order to achieve this, the network of the legacy system has to be upgraded, causing the cost increase.

In addition, a UE in higher priority system may fallback to lower priority system due to out of service, cell reselection, handover, circuit-switched fallback and IMS SRVCC. Once the UE fallbacks to lower priority system, it may be difficult to return to higher priority system due to the lack of cell information of higher priority system provided by lower priority system. Lower priority system may be lack of cell information of higher priority system due to network planning. The detailed description can be referred from above, so it is not given herein.

SUMMARY OF THE INVENTION

The application discloses a method for radio access technology change in order to solve the abovementioned problem.

The present invention discloses a method for radio access technology, hereafter called RAT, change for a mobile device. The method comprises whenever camping on a RAT, collecting cell information for at least one cell, falling back to a first RAT, and performing an offline procedure for moving to the camped RAT from the first RAT according to the collected cell information.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 illustrates a schematic diagram of a cell database.

DETAILED DESCRIPTION

Figure 1:
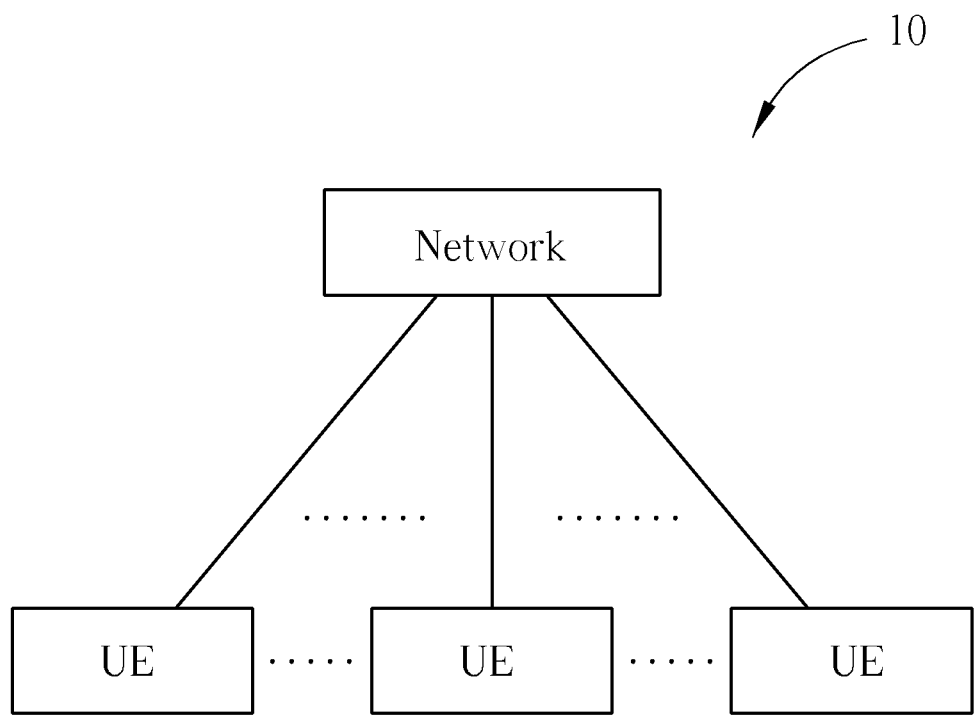
FIG. 1 illustrates a schematic diagram of an exemplary wireless communication system.

Please refer to FIG. 1, which is a schematic diagram of a wireless communication system 10. The wireless communication system 10 is a Long-Term Evolution (LTE) system or other mobile communication systems, and is briefly composed of a network and a plurality of user equipments (UEs). In FIG. 1, the network and the UEs are simply utilized for illustrating the structure of the wireless communication system 10. Practically, the network may be an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
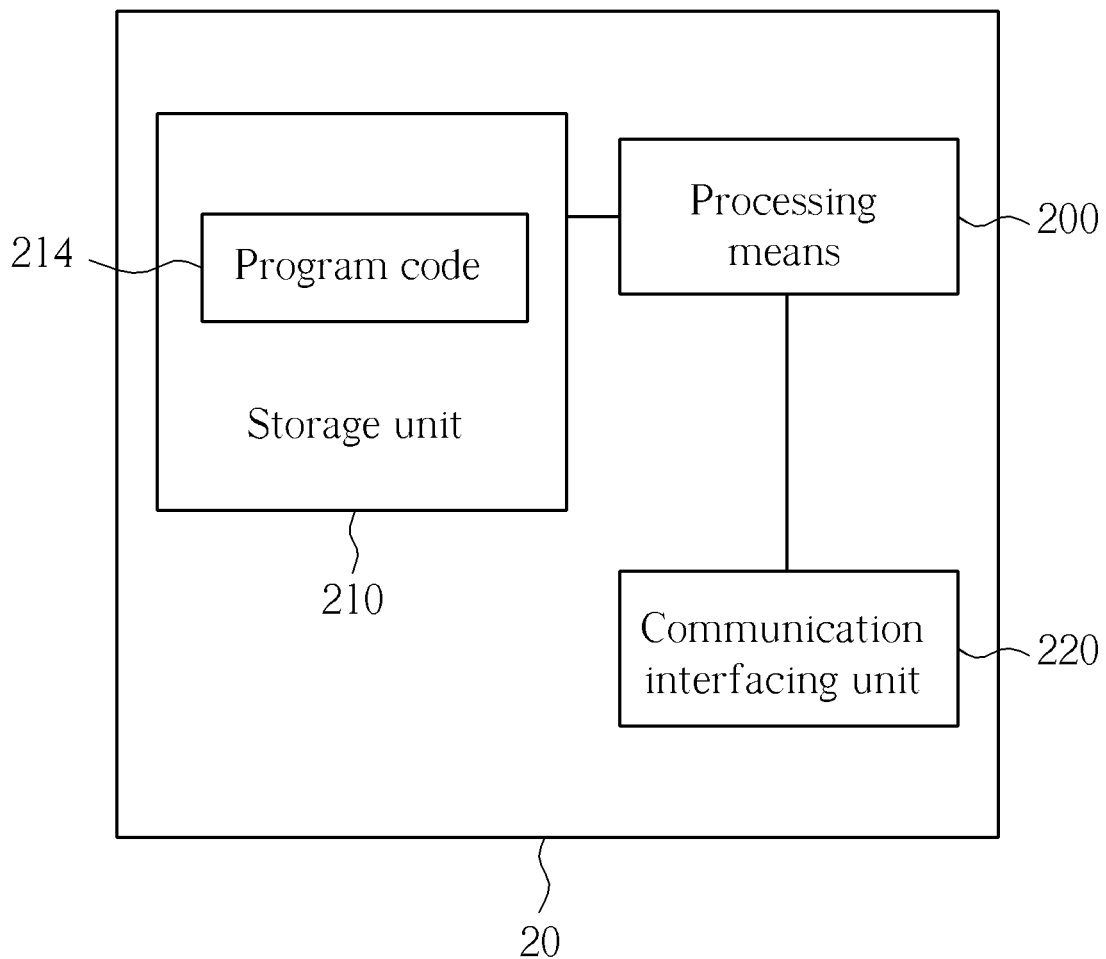
FIG. 2 illustrates a schematic diagram of an exemplary communication device.

FIG. 2 illustrates a schematic diagram of an exemplary communication device 20. The communication device 20 can be the UE shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
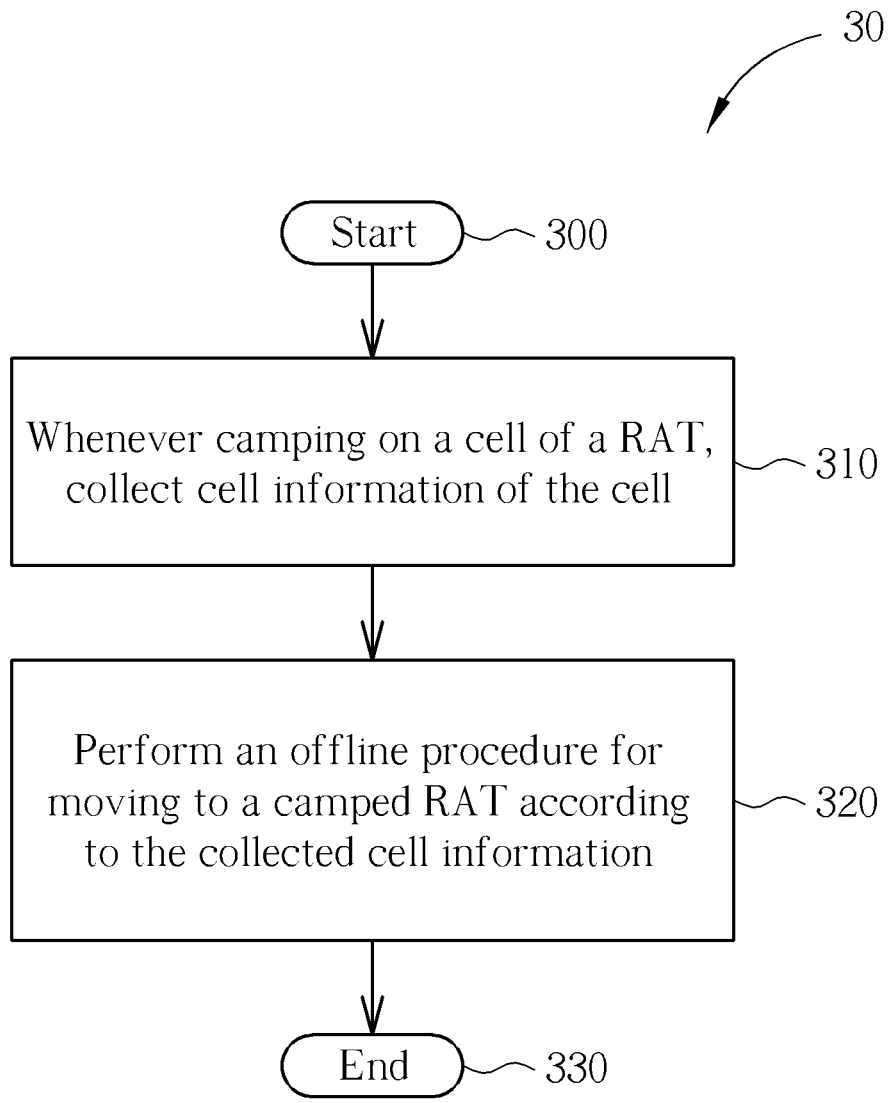
FIG. 3 is a flowchart of an exemplary process.

Please refer to FIG. 3, which illustrates a flowchart of an exemplary process 30. The process 30 is utilized in a UE for a radio access technology (RAT) change. The process 30 can be compiled into the program code 214 and includes the following steps:

Step 300: Start.

Step 310: Whenever camping on a cell of a RAT, collect cell information of the cell.

Step 320: Perform an offline procedure for moving to a camped RAT according to the collected cell information.

Step 330: End.

According to the process 30, the UE moves to a camped RAT according to cell information, which is collected when the UE camps on it. Thus, the UE does not require cell information/redirection information from the network, so that the number of signaling is reduced and the UE can quickly move to the camped RAT. In addition, the network upgrade is not necessary, and thereby the network operator can save the cost.

Take an example based on the process 30. The UE camps on a first cell of a first RAT, and collects first cell information of the first cell. In addition, when the UE moves to a second cell of a second RAT, the UE collects second cell information of the second cell, and so on. The collected cell information may include at least one of system of the cell, system priority of the cell, PLMN of the cell, downlink and uplink of cell frequency channel, and cell identity. The UE may cache the collected cell information into a cell database where the cell database is achieved by storing the cell information into a non-violated memory. Please refer to FIG. 4, which illustrates a schematic diagram of the cell database. The system recorded in the cell database includes LTE, UMTS, GSM, GPRS, CDMA, etc. The system priority is the priority index (e.g. "1"-"3") used to separate the cells between higher priority system and lower priority system. For example, in FIG. 4, LTE system has higher priority than the UMTS system, and the UMTS has higher priority than the GSM. The PLMN includes the mobile country code (MCC) and the mobile network code (MNC), and can be derived from system information broadcasted by the cell. For example, in FIG. 4, PLMN is recorded as "310410", wherein the MCC code is represented as '310', and the MNC code is represented as '410'. The downlink and uplink of cell frequency channel is the frequency information of the cell. In addition, it can be the format of ARFCN for GSM/GPRS, UARFCN for UMTS and EARFCN for LTE or in the format of frequency, i.e. MHz or KHz. The cell identity indicates the identity of the cell. The cell identity can be used for identification when the UE intends to search a target cell. Moreover, the cell database records the cell database index "0"-"4" for rapidly acquiring the corresponding cell information.

In some cases, the UE may need to move to the first RAT. In this situation, the UE performs the offline procedure to move from the second RAT to the first RAT according to the collected first cell information. There are three ways to realize the offline procedure, which includes offline cell reselection, offline cell redirection and offline PLMN search. For an operation of the offline cell reselection, the UE performs offline cell reselection procedure by measuring and evaluating cells in the first system or cells in the first frequency cached in the cell database. If one of the measured cells has the highest ranking during the offline cell reselection procedure, the UE reselects to the cell, so as to move from the second RAT to the first RAT. Note that, the highest ranking here means that the cell is measured by the UE with the highest signal level or the highest signal quality.

For an operation of the offline cell redirection, the UE performs the offline cell redirection procedure by creating a virtual information element carrying the redirection information, e.g. system, which is provided by the collected cell information of the cell database, and including such virtual information element into a virtual radio resource control (RRC) connection release message/RRC reject message generated by the UE. Please note that the cell database may save collected cell information for more than one cell and the redirection information may or may not include search information for all cells of the cell database. For example, the system provided by the cell database could be relevant to the last recoded cell of the cell database. Therefore, the UE can be redirected to a cell of the first RAT. On the other hand, for an operation of the offline PLMN search, the UE performs the offline PLMN search procedure by performing PLMN search over the PLMN of the first cell stored in the cell database. With this method, the UE may have higher chance to move from the second RAT to the first RAT.

Based on the concept of the process 30, take another example as following. The UE collects cell information when it camps on a cell in a high priority system. Note that, the UE may fallback to a low priority system/legacy system due to out of service, cell reselection, handover, circuit switched fallback (CS fallback) or IMS SRVCC. With the abovementioned offline procedure, the UE can quickly forward to the high priority system after the UE fallbacks to the low priority system or legacy system. Particularly, the UE performs PLMN search procedure/offline cell reselection/offline cell redirection according to the high priority cell information stored in the cell database.

In detail, the UE performs the offline cell reselection procedure by measuring and evaluating cells in the high priority system cached in the cell database. If the measured cell has the highest ranking during the offline cell reselection procedure, the UE reselects to the cell. Or, if a cell has the highest priority, the UE reselects to the cell. Or, the UE performs the offline cell reselection procedure by creating a virtual information element carrying the reselection information, e.g. indicating the high priority system, which is provided by the collected cell information of the cell database, and virtually including such virtual information element into system information, i.e. the UE virtually considers or adopts the reselection information of such virtual information element although such virtual information element is actually not included in the system information. Therefore, the UE can be reselected to the high priority system. Or, the UE performs the offline PLMN search procedure by performing PLMN search over the PLMN of the cell stored in the cell database. Therefore, the UE has high chance to forward to the cell in the high priority system. Please note that the cell database may save collected cell information for more than one cell and the offline PLMN search procedure may or may not search all cells of the cell database. For example, the offline PLMN search procedure could search the last recoded PLMN of the cell database.

Figure 5:
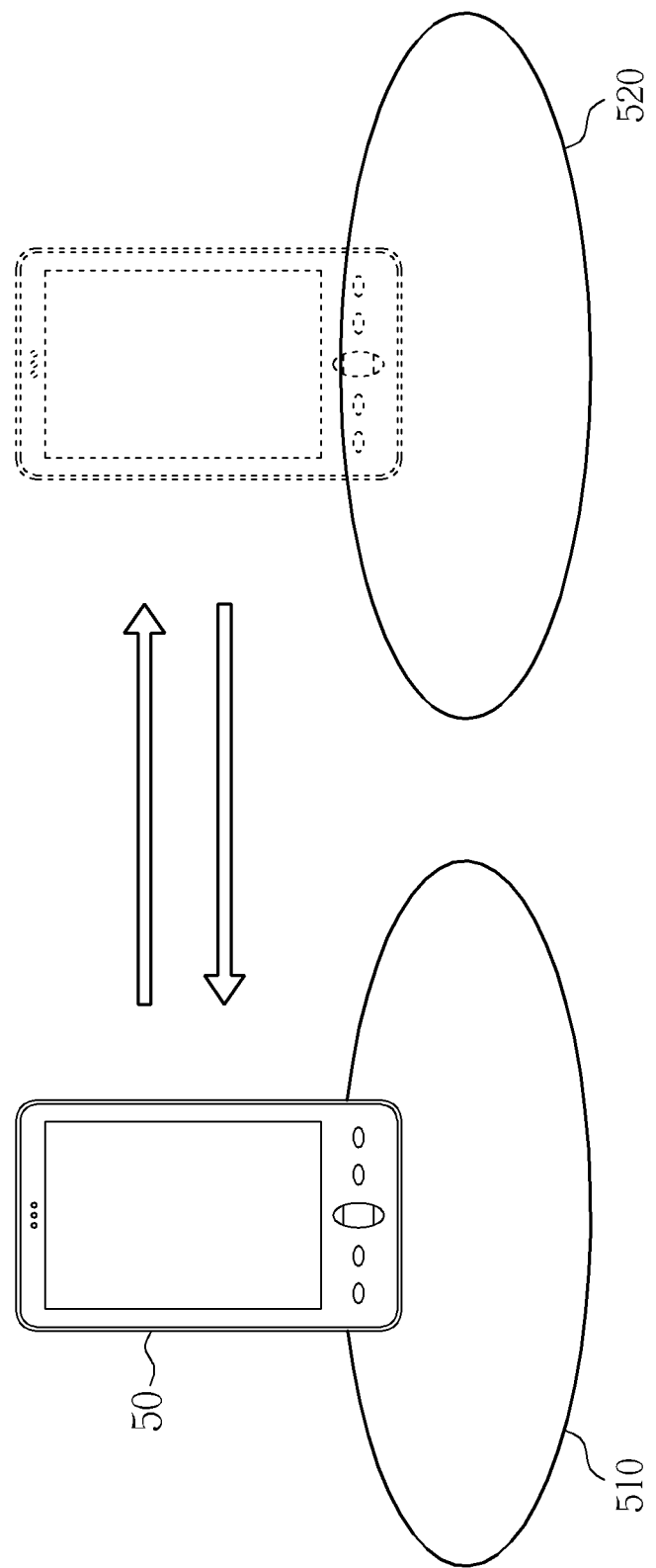
FIG. 5 illustrates a schematic diagram of a radio access technology change.

Moreover, please refer to FIG. 5, which illustrates a schematic diagram of a RAT change. In FIG. 5, the UE designed for the LTE system camps on a LTE cell 510, and then fallbacks to a cell 520 of a legacy system or less priority system (e.g. UMTS system) when the UE is out of service of the LTE system, or performs cell reselection, handover, circuit switched fallback (CS fallback) or IMS SRVCC to the UMTS system. As abovementioned, the UE has collected the cell information of the LTE cell when camped on it, so as to perform the offline procedure to return from the UMTS system to the LTE system. Note that, since the UE is designed for the LTE system, the UE shall move from the UMTS system to the LTE system, to acquire full service provided by the LTE system. The detailed description for the operation of the offline procedure (e.g. the offline redirection/offline reselection/offline PLMN search) can be referred from above, so it is not given herein.

As can be seen, a UE can quickly return to a high priority system (e.g. the LTE system) with the offline procedure if it fallbacks to the less priority system (e.g. UMTS system), so that the network does not have to provide information for the UE to return to the high priority system. Thus, signaling number and network upgrade cost can be reduced.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the present invention provides a method for handling RAT change. The UE collects cell information associated to a camped cell of a RAT, and executes the offline procedure to return to a camped RAT according to the collected cell information, so as to reduce the time for returning. In addition, network does not need to be upgraded for providing system information/redirection information, and thereby saving the cost for the network operator.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for radio access technology, hereafter called RAT, change for a mobile device, the method comprising:
whenever camping on a RAT, collecting cell information for at least one cell;
falling back to a first RAT; and
performing an offline procedure for moving to the camped RAT from the first RAT according to the collected cell information;
wherein the collected cell information includes at least one of a system, a system priority, a public land mobile network (PLMN), frequency information, and a cell identity of the at least one cell, and performing the offline procedure for moving from the first RAT to the camped RAT according to the collected cell information comprises:
performing the offline procedure for moving from the first RAT to the camped RAT by the mobile device generating a virtual radio resource control (RRC) connection release message with a virtual redirection information element indicating at least one of the collected cell information.

2. The method of claim 1, further comprising:
performing an inter-RAT procedure for falling back to the first RAT when the mobile device is out of service, or performs a cell reselection, handover, circuit switched fallback (CS fallback), or Internet Protocol Multimedia Subsystem (IMS) Single Radio Voice Call Continuity (SRVCC).

3. The method of claim 1, wherein performing the offline procedure for moving to the camped RAT from the first RAT according to the collected cell information comprises:
performing the offline procedure for moving from the first RAT to the camped RAT according to the collected cell information, wherein the camped RAT has higher priority than the first RAT.

4. The method of claim 1, wherein the system of the at lest one cell includes at least Long Term Evolution (LTE), Universal Mobile Telecommunications System (UMTS), Global System for Mobile communications (GSM), GPRS, or Code Division Multiple Access (CDMA).

5. The method of claim 1, wherein performing the offline procedure for moving from the first RAT to the camped RAT according to the collected cell information comprises:
performing the offline procedure for moving from the first RAT to the camped RAT by measuring one of the at least one cell included in the collected cell information.

6. The method of claim 1, further comprising:
being redirected to one of the at least one cell of the camped RAT.

* * * * *